Figure 1:
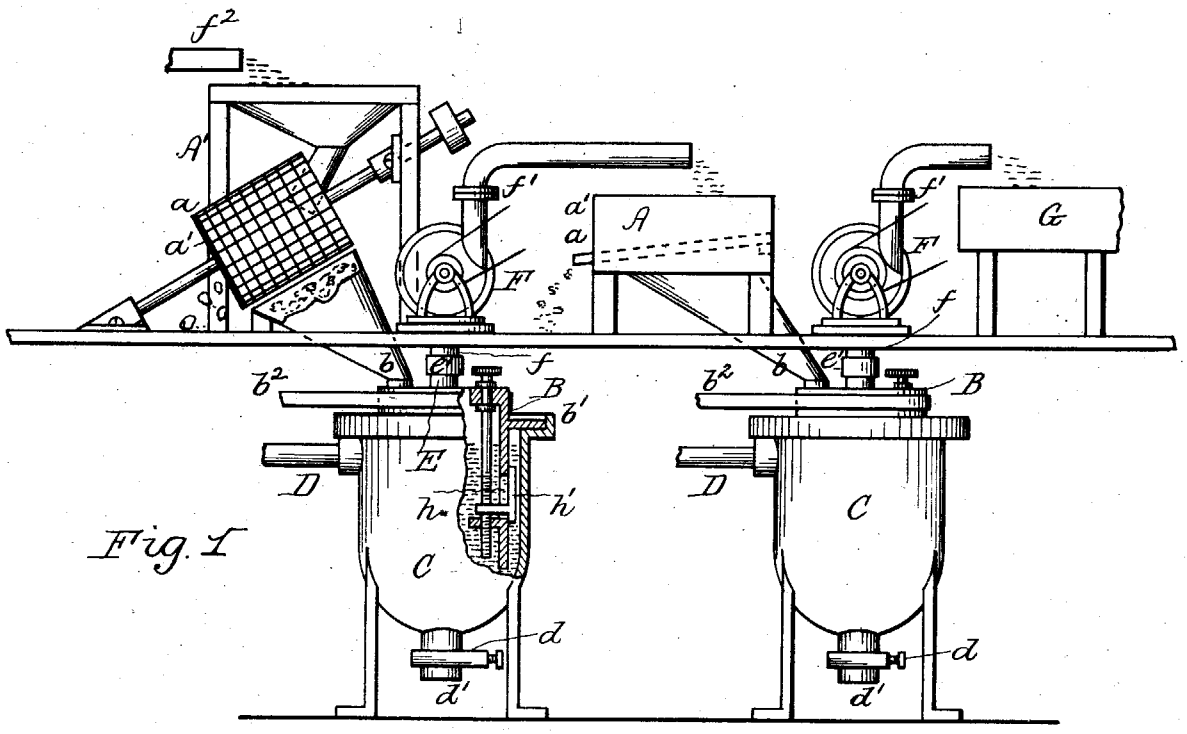

2 Sheets—Sheet 1.

C. F. PIKE.

ORE WASHER AND CONCENTRATOR.

No. 11,377. Reissued Oct. 24, 1893.

WITNESSES:
K. Van Stavoren.
L. Van Stavoren.

INVENTOR
Charles F. Pike
By A. J. Van Stavoren
Attorney

2 Sheets—Sheet 2.

C. F. PIKE.

ORE WASHER AND CONCENTRATOR.

No. 11,377. Reissued Oct. 24, 1893.

WITNESSES
K. Van Stavoren.
L. Van Stavoren.

INVENTOR
Charles F. Pike.
By S. J. Van Stavoren
Attorney

UNITED STATES PATENT OFFICE.

CHARLES F. PIKE, OF PHILADELPHIA, PENNSYLVANIA, ASSIGNOR TO WILLIAM A. PIKE, TRUSTEE, OF SAME PLACE.

ORE WASHER AND CONCENTRATOR.

SPECIFICATION forming part of Reissued Letters Patent No. 11,377, dated October 24, 1893.

Original No. 458,837, dated September 1, 1891. Application for reissue filed June 15, 1893. Serial No. 477,757.

*To all whom it may concern:*

Be it known that I, CHARLES F. PIKE, a citizen of the United States, residing at Philadelphia, in the State of Pennsylvania, have invented certain new and useful Improvements in Ore Washers and Concentrators; and I do hereby declare the following to be a full, clear, and exact description of the invention, such as will enable others skilled in the art to which it appertains to make and use the same.

My invention has relation to ore washers and concentrators of the form wherein the gangue or ore is fed into a vessel having a water supply which spreads or distributes the ore or gangue throughout the cross-sectional area of the vessel below its water level to effect a quick or rapid separation of the heavy particles of gold from the ore or gangue and admit of them falling to and accumulating at the bottom of the vessel wherefrom they are withdrawn from time to time as desired, while the tailings and commingled water are discharged from the vessel.

My invention has for its object simplicity of construction and efficiency of operation of the washer and concentrator whereby it is capable of rapidly and economically continuously separating the metal from large quantities or bulks of gange to make it especially available for use for washing and concentrating low grade ores and materially diminishing the cost of correspondingly working high grade ores.

My invention has for its further object to more effectually and thoroughly spread or distribute the gangue in the water as it is fed into the vessel and to maintain it while in its distributed condition in a state of agitation to effect a more thorough separation of the heavy particles of metal from the gangue and provide for a more rapid discharge of the tailings from the vessel.

My invention has for its further object to economize in the amount or volume of water used for the washing and concentration which economy of water results in a saving of power required for operating the actuating devices necessary for effecting the washing and concentration.

My invention further consists of the combinations, constructions and arrangements of parts as hereinafter more fully described in the specification and pointed out in the claims.

Reference is had to the accompanying drawings, wherein—

Figure 3:
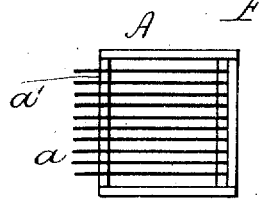
Figure 4:
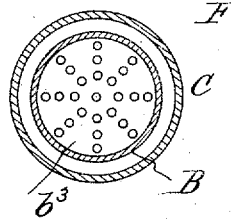
Figure 2:
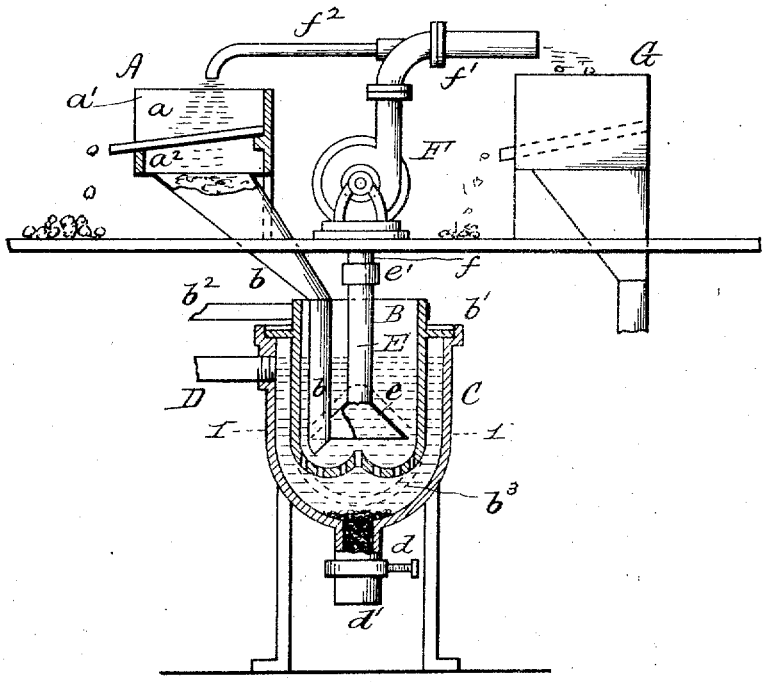

Figure 1, is an elevation with parts broken away and in sections, of two ore washers and concentrators embodying my invention. Fig. 2, is a sectional elevation of a single washer or concentrator, showing detail modifications and arrangements of water pipes for economizing in the volume of water consumed for the washing and concentrating. Fig. 3, is a plan showing a form of grating for the supply end of the washer and concentrator, and Fig. 4, is a section on the line 1—1, Fig. 2.

A A′ represent two forms of feeding boxes or receptacles, each of which may have an inclined grating or analogous surface $a$ leading to a discharge end $a'$, said boxes having open bottoms $a^2$ below the gratings $a$ of any suitable form and location desired. From the bottom $a^2$ of a box, leads a chute pipe $b$, which enters and depends into near the bottom of an open top cylindrical receiver B, which is supported in any suitable manner or as indicated at $b'$, Fig. 2, upon an outside jacket or chamber $c$ so as to admit of chamber B being rotated by a band, chain or belt $b^2$, suitably applied and driven, the actuating or power transmitting devices for said belt $b^2$ not being shown in the drawings, as they are obvious.

At or near the top of the outer chamber C is a water supply pipe D, and at its bottom is a valve $d$ of any suitable or desired construction, to admit of drawing off periodically or otherwise any accumulations of ore in chamber C through out-let pipe $d'$.

The bottom of the receiver B may be constructed as desired. Thus for instance, it may be semi-spherical as indicated by dotted lines $b^3$, Fig. 2, to correspond with the configuration of the bottom of chamber C, or it may be in the form of an annular rounding with central conical surface, as indicated by full lines, Fig. 2. Said bottom may be integral with receiver B or otherwise as desired.

Depending into the receiver B is a pipe E which may have an outwardly-flaring or inverted funnel-shaped lower end $e$ for embracing or location near to the bottom $b^3$ of the receiver B. This pipe E may connect by a slip or other joint $e'$ with the inlet pipe $f$ of a suction or sand pump F of the kind which admits of the passage through it of a large bulk or volume of material, the same being a valveless or centrifugal pump, and is commercially termed a "coal pump." When only one washer or concentrator is used as indicated on Fig. 2, the outlet end $f'$ of pump F discharges onto a waste or tailings grating or sluice G. If successive washers and concentrators are employed, as illustrated in Fig. 1, the outlet ends $f'$ of each successive pump F discharge into the grating box A for the successive washers or concentrators. The grating $a$ may be a flat open one as shown in Fig. 3, or a revolving cylindrical one, as indicated in Fig. 1.

The operation is as follows: The gangue with the contained bowlders, stones or other bulky matter as contra-distinguished from prepared or pulverized gangue, is dumped or supplied to the grating $a$ which separates from the gangue the bowlders or other large waste material which escapes at the end $a'$ of a box. A stream or supply of water may be led into the box above the grating $a$ in any suitable manner as shown in the drawings. In Fig. 1, said supply is shown as coming from a pipe $f^2$ separate or disconnected from the pump discharge pipe $f'$ while in Fig. 2, said pipe $f^2$ is shown as being connected to or is a branch of the pump discharge pipe $f'$ which effects an economy in the volume of water used for washing and concentrating and a saving of power for operating the pump F as hereinafter more fully explained. The screened gangue from grating $a$ is conveyed by chute pipe $b$ into inner receiver B to near the bottom of the same or below the level of the water therein at which point it is subjected to the upward flow or current of water from the supply pipe D through chamber C and up through the perforations in the bottom or partition $b^3$ of the receiver B. Such upward flow, current or motion of water serves, and in agitating and spreading the gangue in receiver B as it is deposited therein to facilitate the separation of the heavy particles of metal from the gangue which metal falls to the bottom $b^3$ through the perforations therein to the bottom of chamber C from which they may be withdrawn as desired by opening the valve $d$ in outlet pipe $d'$ for chamber C. The agitation of the gangue in receiver B is further facilitated by revolving the receiver B, so that during the small interval of time which elapses between the passage of the gangue into receiver B and its subjection to the action of the pump F, such gangue is thoroughly spread and agitated in receiver B to admit of the heavy particles of metal falling through the gangue to the bottom of receiver B. The waste or tailings and commingled water are raised or lifted through pipe E by the pump F, and discharged therefrom as the condition or form of the ore in the tailings requires. Thus for instance, if all of the metal is "shot ore" only one washer and concentrator may be required, in which case, the pump F will discharge into a waste sluice. If the gangue contains "scale ore" a second succeeding washer and concentrator is preferably used as indicated in Fig. 1, in which case the first pump F discharges into a second box A having grating $a$. If desired the pump F for the second washer and concentrator may be run at a speed less than that of the pump for the first one; or in other words, the discharge from the former is less than that from the latter. This difference of discharge admits of more thoroughly separating the metal from the gangue without waste of metal. Instead of varying the discharge of the pump or pumps by differentiation of running speed, the same may be accomplished by adjusting the funnel end $e$ of pipe E to and from the bottom $b^3$ of the receiver B, so as to increase or decrease the suction force of pipe E, and to this end the pipes E are provided with a slip or adjustable joints $e'$, or, the side of the receiver B may be provided with an opening $h$, closed by any suitable valve $h'$, which when closed causes all the water entering the receiver B from chamber C to pass through the perforations in the bottom $b^3$ to produce the maximum spreading and agitation of the gangue in receiver B; but by opening said valve part of such water flows into receiver B through the opening $h$, and this reduces the velocity of the upward flow through the perforations in bottom $b^3$ for varying the degree of the spreading and agitation of the gangue produced by said flow in the receiver B, and in turn the extent of the discharge of the pump F. If the gangue contains float or flowered gold or metal, the discharge from the washer or washers as above described is conveyed to further washing and concentrating apparatus and, further if desired to any amalgamating appliances, forms of which I have shown and claimed in two other pending applications of an even date herewith, Serial Nos. 375,313 and 375,314, respectively. When the pipe $f^2$ for supplying water to the boxes A, A' is a branch from the discharge pipe $f'$ of the pump F, a portion of the tailings from a washer and concentrator is returned to it and such tailings water is used over and over. Hence a less volume of water is necessary for effecting the washing and concentration, less water is pumped and less power is required to work the pumps, which power is still further diminished by the upward flow of water in receiver B floating and elevating the tailings to within the influence of the suction of the pump and assisting it to discharge them from receiver B.

From the foregoing it will be noted that all bowlders or large or bulky waste material is removed from the ore or gangue before it enters the concentrator, and in its passage through the latter the metal particles are separated from the gangue, so that as it passes through each successive washer and concentrator, less and less gangue or tailings are pumped from one to the other, until finally when pumped to the amalgamating devices the amount of tailings is reduced to a minimum with the float or flowered metal in such concentrated condition that the best available results both as to rapidity of flow through the amalgamator for thoroughness of amalgamation are obtained. This maximum concentration of the float or flowered metal is particularly available when the successive pump discharge-pipes $f'$ have the branches $f^2$ leading back to the washer and concentrator from which the pump discharges as each successive pump discharges less water or tailings. Thus for instance, if the first pump discharges sixteen hundred gallons a minute, the second may only discharge four hundred, and the third one hundred, which if conveyed to the amalgamating devices shows a concentration of sixteen to one for the latter devices. This large degree of concentration combined with the thoroughness and rapidity of action and economy of water used renders the appliances especially available for profitably working the low grade ores, placer mining generally, and for greatly diminishing the cost of working high grade ores with the minimum percentage of waste or loss.

From the foregoing it will be still further noted that mined or natural gangue is supplied to a grating $a$, that the same as it enters the receiver B is agitated by an inward and upward flow current, force or motion of water, the velocity of which may be varied as desired to conform to the conditions of the ore under treatment; that such agitated gangue together with any contained solid or bulk matter is forcibly discharged from the receiver B by pumps F and that the operation is continuous and rapid. Hence said washing and concentrator appliances are especially available for use in places where the supply of water is restricted and also for washing and concentrating dredged or raised river bottom material containing ore, and placers, whether or not the same be a poor or a rich grade.

From the foregoing it will be still further noted that the ore or gangue fed to the receiver B is in a more or less diffused or distributed condition and in that state is agitated by the water in the receiver, and, as the waste matters of the ore or gangue are lighter than the metal they more quickly feel the influence of the suction force in pipe F and being induced thereto are further diffused to admit of the metal separating from them before they acquire their full discharging velocity.

As the construction and arrangement of the receiver B, the device for producing the upward flow or current of water through the receiver, and the suction pipe communicating therewith may be greatly changed without departing from the spirit of my invention, I do not confine myself to the constructions and arrangements of the same as shown and described, but

What I claim is—

1. In an ore washer or concentrator, the combination of a receiving vessel having a water supply, a feed device depending into and below the surface of the water in said receiving vessel, and a suction discharge device correspondingly depending into said vessel, substantially as set forth.

2. In an ore washer or concentrator, the combination of a receiving vessel having a water supply, a feed device and a suction discharge, substantially as set forth.

3. In an ore washer or concentrator, the method of washing and concentrating the ore or gangue which consists in subjecting a descending feed or supply of gangue to a simultaneous upward flow or force of water and a suction discharge, substantially as set forth.

4. In an ore washer or concentrator, the method of washing and concentrating the ore or gangue, which consists in first subjecting a descending feed or supply of gangue to an upward flow or force of water to spread and agitate the ore or gangue to effect a separation of the metal from the waste matters, and then discharging the latter by suction, substantially as set forth.

5. An ore washer or concentrator, the combination of a screen, a feed device below said screen leading into the washer, a water supply for spreading and agitating said feed, and suction discharge device, substantially as set forth.

6. In an ore washer or concentrator, the combination of a feed device, a suction discharge device, and a branch pipe leading from said discharge device back to the washer or concentrator, substantially as set forth.

7. A method of washing and concentrating ore which consists in first screening the ore or gangue of any bulky waste material, then subjecting it to a spreading and agitating action in water, then discharging the tailings, and then returning part of the tailings-water to the water wherein the gangue is subjected to the spreading and agitating action, substantially as set forth.

8. A method of washing and concentrating ore which consists in successively passing the gangue through different bodies of water, correspondingly discharging less and less quantities of tailings from each said successive bodies of water, and returning part of the discharged tailings-water to the bodies of water from which it was discharged, substantially as set forth.

9. In an ore washing or concentrating apparatus, the combination of a grating, a vessel or jacket having an upward flow or current of water and a valved outlet-pipe, an inner receiver provided with a perforated bottom through which said upward flow or current passes into the receiver, a discharge pipe between said grating and the receiver, and suction-pump having a pipe depending into said receiver, substantially as set forth.

10. In an ore concentrator and washer, the combination of a receiving-chamber having a perforated bottom or partition, a pipe connected with said receiver and supplying water to the space between said receiver and partition, which water passes upward through the latter and a pump having a suction pipe projecting into said chamber to a point immediately above the perforated bottom.

11. In an ore concentrator and washer the combination of a receiving chamber having an outlet pipe and a perforated partition above the outlet pipe, a pipe connected with said receiver and supplying water to the space between said receiver and partition, which water passes upward through the latter and a pump having a suction-pipe projecting into said chamber immediately above the perforated bottom.

12. In an ore washing or concentrating apparatus, the combination of a receiver having valved outlet-pipe, a supply pipe for said receiver, a suction-pipe in communication with said receiver, and means for varying the velocity of said upward flow or current and the amount of volume of discharge from said pump, substantially as set forth.

13. In an ore washing or concentrating apparatus, the combination of a grating box A, the receiver B, having an upward flow or current, a supply-pipe for the latter, and a suction pump F, communicating with said receiver, substantially as and for the purpose set forth.

14. In an ore washing or concentrating apparatus, the combination of a grating box A, the rotating receiver B, having an upward flow, or current, a supply-pipe from said grating box to the receiver, an out-let pipe for the latter, and a suction pump F, communicating with said receiver substantially as and for the purpose set forth.

15. In an ore washing or concentrating apparatus, the combination of successive receivers, each having an upward flow or current of water and a suction pump for discharging the gangue, and the pump for the successive receivers, arranged or operated to have different discharging capacities, substantially as set forth.

16. In an ore washing or concentrating apparatus, the system of subjecting the mined or natural gangue, to, first, a separating device for removing the bowlders or analogous bulky material from the gangue, then subjecting the latter to an upward flow or current of water, and then to a simultaneous suction force to separate said gangue to permit the ore to separate therefrom and the gangue to be discharged from the apparatus, substantially as set forth.

CHARLES F. PIKE.

Witnesses:
S. J. VAN STAVOREN,
LOUIS E. PIKE.